United States Patent

[11] 3,594,587

[72] Inventors Gerhard Martens;
 Herbert Turk, both of Remscheid-Lennep, Germany
[21] Appl. No. 886,087
[22] Filed Dec. 18, 1969
[45] Patented July 20, 1971
[73] Assignee Barmag Barmer Maschinenfabrik Aktiengesellschaft
 Wuppertal, Germany
[32] Priority Dec. 24, 1968
[33] Germany
[31] P 18 16 936.3

[54] DEVICE FOR TRANSMITTING SIGNALS BETWEEN A ROTATABLE MEMBER AND A FIXED MEMBER
5 Claims, 6 Drawing Figs.

[52] U.S. Cl. .................................................. 307/149,
 73/350, 73/351, 336/120, 336/122
[51] Int. Cl. ...................................................... G01k 13/08
[50] Field of Search ........................................ 336/120,
 122, 123, 126; 73/350, 351; 307/149

[56] References Cited
UNITED STATES PATENTS

| | | | |
|---|---|---|---|
| 2,867,783 | 1/1959 | Childs | 336/123 |
| 3,112,070 | 11/1963 | Seney | 73/351 X |
| 3,179,909 | 4/1965 | Cheney | 336/120 |
| 3,183,718 | 5/1965 | Schnedler | 73/351 |
| 3,290,943 | 12/1966 | Hsinlili et al. | 73/351 X |
| 3,303,701 | 2/1967 | Matsuura et al. | 73/351 |
| 3,324,724 | 6/1967 | Essers et al. | 73/351 X |
| 3,347,453 | 10/1967 | Goergen | 73/351 |
| 3,391,576 | 7/1968 | Takami et al. | 73/351 |

FOREIGN PATENTS

| | | | |
|---|---|---|---|
| 994,936 | 6/1965 | Great Britain | 73/351 |
| Z3742 | 6/1956 | Germany | 73/351 |

OTHER REFERENCES

Dahl A., " Laboratory Evaluation Of A Method Proposed By Gnan For Measuring The Temperature Of Rotating Parts," NBS RESEARCH PAPER RP1942, pp. 601— 607, Dec. 1948.

" Turbine Blade Temperature Telemeter," NBS TECHNICAL NEWS BULLETIN, Dec. 1954, pp. 180— 183.

Primary Examiner—Robert K. Schaefer
Assistant Examiner—William J. Smith
Attorney—Johnston, Root, O'Keeffe, Keil, Thompson & Shurtleff ABSTRACT: A device for the transmission of two or more signals, such as control signals, between a rotatable member such as a roller and a fixed or stationary member, e.g. as required in textile machines for the control of heated godets or rollers which convey thread on a heated surface maintained at a predetermined temperature, said device including at least two elongated arcuate signal transmitting elements carried rotatably on an annular planar support secured to the godet or roller and preferably two stationary transmitting elements for each of the rotatably carried transmitting elements wherein at least one of the stationary transmitting elements always remains in an operative coupling position with a rotatably carried transmitting element to form an individual transmitting unit for one of the signals.

PATENTED JUL 20 1971
3,594,587
FIG. 1
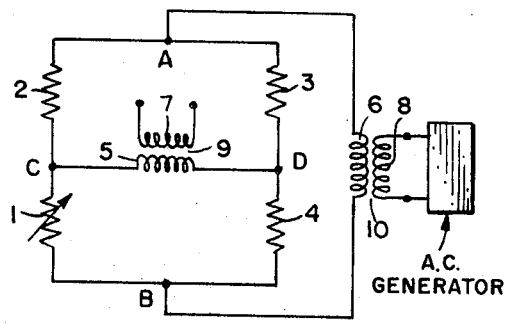
FIG. 2
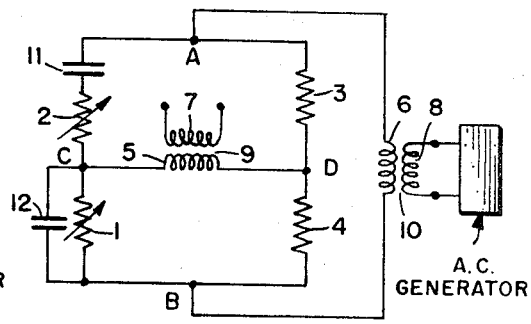
FIG. 3
FIG. 4
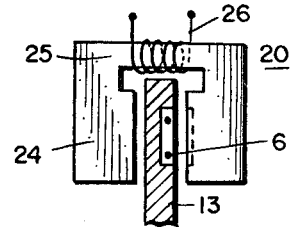
FIG. 5
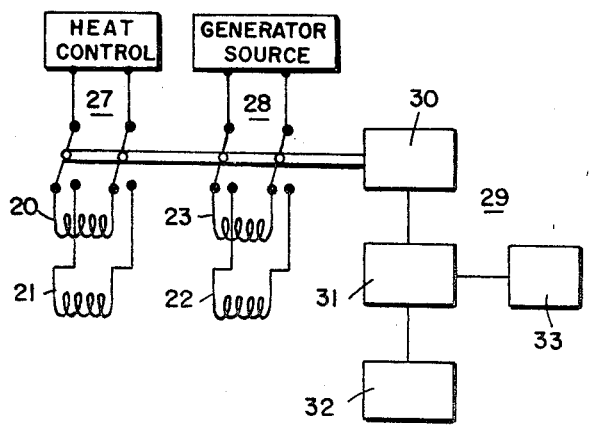
FIG. 6
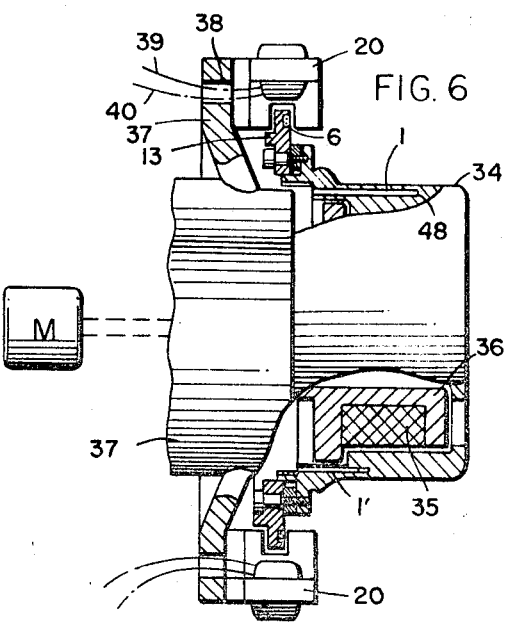
*INVENTORS:*
GERHARD MARTENS
HERBERT TURK
BY: *Johnston, Root, O'Keeffe, Keil, Thompson & Shurtleff*
ATT'YS

DEVICE FOR TRANSMITTING SIGNALS BETWEEN A ROTATABLE MEMBER AND A FIXED MEMBER

The present invention relates to a device of the type required for the transmission of several signals, such as control or drive signals, between a revolving machine part and a stationary machine part. Devices of this type are often used in textile machines in which many heated, intermittently driven rotatable godets or rollers are used for heating and conveying filaments, yarns, threads, ribbons, foils or the like. The temperature of the thread-contacting surface of these heated godets is continuously monitored by a heat-sensing means, such as a thermistor, resistance thermometer, or other equivalent resistor responsive to temperature changes. The signal resulting from the heat sensor is transmitted to a control or regulating device mounted externally of the rotatable godet, e.g. in order to regulate the supply of heat to the walls of the godet.

The simplest method of achieving this signal transmission is a direct electrical connection between the heat sensing means and the control or regulating device, which is possible only where both the heat sensor or resistor and the control device are stationary. The heat from the godet wall surface in connect with the threads, ribbons, foils or the like is detected by such stationary heat sensor through air convection and by radiation. A direct electrical connection between the heat sensor and control device ensures the transmission of the signal without intermediate sources of error, such as contamination, corrosion or wear between moving parts, all of which would otherwise affect the resistance of the measuring circuit and thus the accuracy of the temperature control system. Devices of this type, using only stationary components, are described in German Pat. (utility model) No. 1,957,805.

There is, however, a valid objection to a transmission system incorporating the stationary heat sensor and direct electrical connection from it to the control device. Because of varying effects of ambient conditions in the air column or gap space through which convection of heat to the sensor occurs, the stationary heat sensor is unable to detect the true godet surface temperature under all operating conditions of the godet or roller. The sensing, transmitting and control system cannot be easily adapted to varying rotational speeds of the godet.

A more accurate detection of this godet surface temperature is achieved by direct conduction of heat through the godet body wall to a heat sensor in physical contact therewith. This is accomplished by inserting the heat sensor in a longitudinal bore of the godet wall or otherwise embedding the heat sensor in the wall in close proximity to its thread-contacting surface. The sensor, of course, will then rotate together with the godet, thereby requiring the detected signal to be transmitted from the revolving godet part to a fixed member. This can be accomplished by conductive means (slip rings and brushes), inductive means (induction coils) or capacitive means (capacitors). Whichever transmitting means is selected, certain components of the signal-transmitting circuit must rotate with the godet and its embedded heat sensor. It would be most convenient if such slip ring contacts, induction coils or capacitors could be arranged in sequence axially of the rotatable shaft of the godet. However, there is generally insufficient space to mount the transmitting elements on the same shaft with the rotatable godet while shielding individual signal transmitting units from each other. This shielding or separation of transmitting units, which can be referred to as a "decoupling" of the individual signals, is particularly necessary where bridge circuits are employed for the temperature measuring system.

For this reason, transmitting elements have been mounted on an annular plate appropriately secured to the godet. For example, if induction means are used for the signal transmission, two induction coils are so constructed and arranged that they can be mounted end for end in the same plane around the circumference of an annular plate or carrying frame concentrically mounted on the godet. Installing the transmitting elements in this rotatably carried manner permits adequate decoupling of the currents carried by the two coils, e.g. where the temperature measuring means is a four-arm bridge circuit which develops and modifies the signal transmitted by the coils. Further, such an installation permits adequate shielding of the components of the bridge circuit from effects due to stray electromagnetic and electrostatic phenomena. The stationary induction coils coupled in this system to the two rotatable transmitting coils can be wound on U-shaped magnetic yokes (iron cores) and mounted in such a manner around the circumference of the annular plate that the opened end of the yokes partially surround the rotatable transmitting coils. This close physical relationship between the stationary and rotatable coils permits induction across the air gap separating the two coils and thus the transmission of a signal. Devices of this type are described, for example, in German Pat. No. 1,23,029.

Occasionally, difficulty is encountered in such a signal transmission system when the godet or roller stops, because the two rotating transmitting elements or coils come to rest in a position where no part of either coil is within the open end of the yoke of the stationary transmitting element or coil assembly. In such a position, a dead point or null exists, and no induction occurs. Without induction, there is no signal transmission and consequently no control on the temperature of the godet surface in contact with a thread, yarn or the like. As a result, overheating can easily occur.

It is therefore a primary object of the present invention to provide for the transmission of signals between a rotatable member and a fixed member, whether the rotatable member such as a roller or godet is in motion or at rest, and independent of the position the rotatable and fixed members assume relative to one another when the device does come to rest. Other objects and advantages of the invention will become more apparent upon consideration of the following detailed disclosure.

In accordance with the invention, a highly dependable and improved multiple signal transmitting device is provided for the transmission of at least two control signals between a rotatably driven and preferably heated roller member, e.g. a godet or the like, and an adjacent fixed member with each signal being conducted or relayed through its own individual transmitting unit. The improved device of the invention essentially includes a circular carrier frame or supporting plate secured to the roller member for rotation therewith about a common axis, a plurality and preferably two elongated arcuate or curved signal-transmitting elements or segments arranged at spaced intervals, i.e. end to end, around a generally planar annular portion of the carrier frame and carried rotatably thereon, and a plurality of stationary signal-transmitting elements positioned in a circumferential direction around the carrier frame so as to provide a number of at least two stationary elements for each rotatably carried transmitting element. Each stationary transmitting element or so-called partial transmitter forms an operative individual transmitting unit when coupled with one of the rotatably carried transmitting elements as the other cooperating partial transmitter. For purposes of the invention, the arcuate interval between adjacent stationary transmitting elements must be greater than the arcuate interval between the adjacent end positions of two of the elongated and rotatably carried arcuate transmitting elements.

Thus, according to the invention, it is necessary to allocate at least two and preferably only two stationary transmitting elements or assemblies to each rotatably carried transmitting element. The elongated and arcuately-shaped transmitter elements must be positioned around the rotatable assembly in a planar layer and also the arcuate interval separating the adjacent or facing ends of two elongated transmitter elements must be relatively large to prevent a coupling or interference of signals being carried separately in each element. Thus, in many instances and particularly in rotatably heated galettes or rollers, the gap or arcuate interval between the end points of the elongated partial transmitters must be larger than the position occupied by one of the stationary partial transmitters, i.e. the width of the latter transmitter measured in a circumferential direction completely falls within the gaps or null points between the elongated transmitters. For this reason, it is essential for the stationary transmitter elements to be spaced apart along the planar surface of the rotatable carrier by an arcuate distance or length which is greater than the arcuate gap length between two adjacent or facing ends of the elongated transmitter elements. By so doing, at least one of the two or more stationary transmitting elements will always be positioned in operative or coupling connection with one of the rotatably carried elongated transmitting elements to form an individual transmitting unit therewith. This principle applies not only to inductive transmitting means but equally as well to other transmitting elements, e.g. conductive or capacitive elements.

In a further embodiment of the invention, it is especially desirable to connect the two or more stationary transmitting elements to a multiple throw switching means which is sensitive or responsive to the position of the rotatably carried transmitting elements. A sensing means such as a photoelectric device is preferably used to detect the position of the rotatably carried transmitting elements and to direct the multiple throw switching means through any suitable relay.

These and other preferred embodiments of the invention are set forth in greater detail hereinafter in conjunction with the accompanying drawing in which:

FIG. 1 is an electrical schematic diagram of measuring and transmitting components connected in a four-arm resistance bridge circuit, illustrating one embodiment of the invention;

FIG. 2 is another electrical schematic diagram similar to FIG. 1 but illustrating the measuring and transmitting elements in a Wien-Robinson bridge circuit;

FIG. 3 is a front plan view, in partly schematic form, of a rotatable godet illustrating the physical arrangement of transmitting elements with reference to each other;

FIG. 4 is a sectional view through the annular carrier frame for the rotatable transmitting element taken adjacent one of the stationary transmitting elements, illustrating one complete signal-transmitting unit;

FIG. 5 is a block circuit diagram of a switching device and other elements of a double-throw switching system according to the invention; and FIG. 6 is a side plan view of a typical heated godet with certain portions cut away or shown in cross section to better illustrate its functional components.

The original transmitting device of the invention is particularly applicable to the operation and control of a rotatably driven and heated godet in otherwise conventional textile machinery. Also, it has been found to be especially advantageous to use inductive signal transmitting means in combination with such rotatable godets. Therefore, all of the embodiments illustrated in the drawings are generally directed to these preferred features in terms of improving the temperature control of godets and achieving a relatively trouble-free operation of means for transmitting control signals from the rotatable godet to the fixed member or members of the textile machine.

Utilizing the most arcuate means of detecting the true temperature of the godet wall surface in running contact with filaments, yarn thread, ribbon, foils or the like, a heat invention. 1 is embedded in a bore of the godet wall 34 in close physical contact therewith. (See especially FIG. 6 for the general appearance of the godet). A second heat sensor 1' can be embedded in the godet wall at a different point along the wall surface, and in fact, a number of such heat sensors can be mounted at varying positions, especially where the single induction heating coil 35 and core member 36 are replaced by a series of two or even three internal heating coils arranged in an axial direction within the rotatable godet 34. Such additional heat sensors are used to more carefully control the heat supply to the respective inductive heating coils, and since all additional heat sensors operate on the same basic principle according to the invention, they have been omitted from the following discussion.

Heat is transferred from the outer surface of the godet to the heat sensor 1 by conduction through the body of the godet wall. The heat sensor, which may be a thermistor, a resistance thermometer or any other equivalent resistor responsive to temperature changes, is one member of a four-arm bridge measuring circuit as indicated in FIGS. 1 and 2. Signal transmitting devices also form a part of this bridge circuit and are mounted on a circular frame or plate 13 which is attached to and revolves with the godet. The plate 13 is separated from the godet only by the interposition of a good heat-insulating material to prevent excessive heating of the signal transmitting means. The godet 34 is rotatably mounted on a shaft journaled in a stationary machine frame 37 and driven by a suitable motor as indicated in FIG. 6.

In FIG. 1, the four-arm bridge measuring circuit illustrated therein is a resistance bridge. The heat sensor 1, schematically indicated as a variable resistor, is wired together with a fixed value resistor 2, 3, and 4 to form the bridge. In place of a battery source across points A and B and a null detector across points C and D, as would be found in the wheat stone bridge, there are located the transmitting coils 6 and 5 respectively. Except for the heat sensor 1, all of these resistor and coil members are mounted as a single structural unit attached to the outwardly projecting annular ring or circular plate 13 of the godet 34 and, along with the heat sensor, rotate with the godet about a common axis. Induction coils 7 and 8, associated with transmitting coils 5 and 6 respectively, are stationary and transmit or receive signals by induction across the air gaps represented by 9 and 10. Stationary induction coil 8 is connected to an AC generator which generates a sinusoidal AC voltage with a frequency of 10 kilohertz (10,000 cycles per second). This frequency can be different if so prescribed by the rating and design of the transmitting devices of the bridge circuit. This AC voltage is induced in the rotatable transmitter coils 5 and 6. When the resistance bridge is in balance, that is, when resistors 1 and 2 bear the same relationship to each other as resistors 3 and 4 bear to each other, there will occur a null between points C and D and no current flow through coil 5. Since the resistance of the heat sensor 1 responds to temperature change by a related change in resistance, which may vary depending on the type of resistor used either directly or inversely with the temperature, the bridge will go out of equilibrium when a temperature change occurs. A potential difference then develops between points C and D causing current to flow in coil 5, resulting in a voltage signal being induced in coil 7, the magnitude and phase relation to coil 8 of which depends on the amount of resistance change in heat sensor 1. Coil 7 is connected to a conventional regulating device (not shown) which responds to this signal, e.g. a means of regulating heat supply to the induction heating coil 35 or other suitable heat element.

In FIG. 2, the four-arm bridge measuring circuit set forth therein is a Wien-Robinson bridge in which a change in resistors 1 or 2 not only reacts with a potential difference between points C and D, and also with an abrupt phase change between input voltage of coil 8 and output voltage of coil 7. In addition to the same circuit members as in FIG. 1, capacitor 11 is added in series with resistor 2, and capacitor 12 is added in parallel with resistor 1. Resistor 2 can become a second heat sensor embedded in the godet wall, but in different bore from that of resistor 1, e.g. as indicated at 1' in FIG. 6. All parts, except coils 7 and 8 and the heat sensors, are securely mounted to the circular plate 13 of the rotatable godet 34 as a single structural unit and, along with the heat sensors, rotate with the godet.

In FIG. 3, there are illustrated the elongated transmitting elements mounted on the circular plate, which in turn is attached to the rotatable and heated godet 34. The two transmitting coils 5 and 6 are mounted in the same plane and arranged end to end with reference to their elongated arcuate shape around the circumference of plate 13. In this manner, optimum decoupling or separation of signals is achieved between these two elongated transmitter elements. Also for this purpose, it is desirable that these two elongated coils 5 and 6 be separated from each other at their end points so that a definite gap or interval exists between the coil ends or extremes 14, 15 and 16, 17 respectively. Such a gap is illustrated by the arcuate length 19. This gap may also be measured as an arc with the angle $\alpha$ extending from the center of rotation 18.

According to the invention, each of the rotatably carried transmitter coils 5 and 6 is associated with at least two stationary coil elements or assemblies 20, 21 and 22, 23 respectively. These stationary transmitting elements must be mounted around the periphery or at overlapping positions on the circumference of the rotatable assembly such that the arcuate length or interval 19' along the plate between the adjacent sides 20', 21' and 22', 23' respectively of each pair of stationary transmitting elements is greater than the arcuate length 19 between either facing ends 14, 15 or 16, 17 of the rotatable coils 5 and 6. This larger arcuate length 19', i.e. measured as the angle $\beta$, must of course be less than $180°-\alpha$ in order to have two stationary coils associated with each rotating coil. This positioning and relation of the transmitting elements assures that in any position which the rotatable and the stationary transmitting elements assume with respect to one another, either while in motion or while stopped, at least one of the stationary transmitting elements will be within the optimum or effective working zone of a corresponding rotatable transmitter coil.

FIG. 4 illustrates one of the stationary transmitting elements or assemblies 22 viewed in side elevation on a cross section through the plate 13. In one surface of circular plate 13 is an annular depression or recess 13' in which is mounted the rotatable induction coil 6. Transmitter assembly 22 as well as the remaining stationary assemblies consists of the U-shaped magnetic yoke (iron core) 24 and induction coil 26 wound on shank 25. Coil 26 is an example of schematically illustrated coils 7 and 8 of FIGS. 1 and 2.

The careful positioning of the stationary transmitter assemblies around the periphery of the rotatable transmitter assembly is intended to prevent the possible occurrence of a dead point (null point) between all stationary and rotatable elements during machine standstill. This positioning ensures a working relation between a rotatable transmitter coil and at least one stationary coil under any condition. However, since rotation of the device temporarily brings one of the two stationary coils into the null point, it is especially advantageous in the device of the invention shown in the drawing to add a double-throw switching means into each transmitting circuit, that is, the measuring bridge generating source and the godet heating control, so that only that stationary transmitting element or coil which, at any given moment, is in the most effective working zone of each rotatable transmitting coil will be connected to its respective circuit. The switching means can be operated by a mechanical, electromechanical, electrical or electronic device, which in turn must be controlled by a device sensitive to the position of the rotatable transmitting coils.

FIG. 5 illustrates by block diagram this further development of the invention. The double-throw switches are represented by 27 and 28. The stationary transmitting coils are 20, 21, 22 and 23. Switches 27 and 28 are preferably electromechanically operated relays, a coil 30 of which is connected to a control amplifier 31, controlled by a photoelectric sensing device 32, which detects the position of the rotatable transmitter assembly in a conventional manner.

Another preferred embodiment of the invention is to provide a means of permitting the double-throw switching relays to be operated only during machine standstill. This can be accomplished by a tachometer generator 33, which generates, when the godet is rotating, a voltage that blocks the operation of switching amplifier 31. This generated voltage thus blocks the operation of switches 27 and 28.

The signal-transmitting device according to the invention is most advantageously and economically constructed with only two rotatable coils 5 and 6 and a pair of stationary coils 20, 21 and 22, 23 for each rotatable coil, respectively. The stationary coils can then be positioned equidistantly around the circumference of the rotatable assembly, i.e. at angular displacements of approximately 90°, thereby permitting a substantial separation and corresponding decoupling as between the ends of coils 5 and 6. The use of induction coils as the transmitting means is also especially preferred since relatively simple circuits can be employed and there is no wear or corrosion of the working elements.

FIG. 6 illustrates an actual godet embodying the preferred elements of the invention. The cylindrical wall 34 of the godet is rotatably mounted on a shaft driven by the motor M, preferably a variable speed motor, with the shaft journaled in a suitable stationary framework 37. In order to heat the godet, a conventional induction heating coil 35 is mounted on the framework 37 in a fixed position within the godet 34, i.e. in a concentric position around the godet axis of rotation. The legs and shank 36 of the induction coil together with the wall 34 of the godet provide a means of indirectly developing heat in the godet wall, the amount of heat being proportional to the current flowing in the induction coil. The signal-transmitting device is then used to monitor and control this current supplied to the induction heating coil.

The heat sensor or resistor 1 is embedded in the godet wall 34 close to its thread contacting surface and is connected in the desired bridge circuit with the remaining circuit elements. For sensing the godet wall temperature at a different point, a second resistor 1' can also be mounted in the godet wall 34 in its own independent bridge circuit. The position of the rotatable coils such as 6 in circular plate or carrying frame 13 secured to the godet 34 is shown in detail in the upper cut away portion of FIG. 6, with some portions shown in cross section as in FIG, 4. Likewise, the stationary coil assembly 20 is shown in its fixed position on the framework 37 with an opening 38 for the coil wires or leads 39, 40 which may then be connected to an externally mounted AC-generator (see FIGS. 1 and 2). Each stationary coil is mounted in the same manner around the circumference of the rotating godet and coil carrying plate. The entire arrangement is quite compact and functions with a minimum of maintenance.

Variations can be made in the illustrated construction of the rotatable and heated godet, including the signal-transmitting means associated therewith, without departing from the spirit and scope of the invention.

We hereby claim the invention as follows:

1. In a device for transmitting at least two control signals between a rotatably driven roller member and an adjacent fixed member, each signal being conducted through its own individual transmitting unit, the improvement which comprises:

a circular carrier frame secured to said roller member for rotation therewith about a common axis;

a plurality of elongated arcuate signal-transmitting elements arranged at spaced intervals around a generally planar annular portion of said circular carrier frame and rotatably carried therewith;

a plurality of stationary signal-transmitting elements positioned in a circumferential direction around said carrier frame in a number sufficient to provide at least two stationary transmitting elements for each rotatably carried transmitting element, each stationary transmitting element forming an operative individual transmitting unit when coupled with one of said rotatably carried transmitting elements and the arcuate interval between two adjacent stationary transmitting elements being greater than the arcuate interval between the adjacent end positions of two of said elongated and rotatably carried arcuate transmitting elements; and means to impart a separate signal to each individual transmitting unit through a transmitting circuit.

2. A signal-transmitting device as claimed in claim 1 wherein a multiple throw switching means is connected with all of the stationary transmitting elements of one transmitting unit for sequentially switching each of said stationary elements in and out of the transmitting circuit at predetermined positions of the rotatably carried transmitting elements such that one stationary transmitting element in the most effective coupling position with respect to a rotatably carried transmitting element is switched in while at least the most remote of the other stationary transmitting elements of the same unit is switched out.

3. A signal-transmitting device as claimed in claim 2 wherein said switching means is operatively responsive to a sensing means for detecting the positions of the rotatably carried transmitting elements.

4. A signal-transmitting device as claimed in claim 3 wherein said sensing means is a photoelectric device which directs said multiple throw-switching means through electromechanically operated relays.

5. A signal-transmitting device as claimed in claim 3 wherein said sensing means and its operative connection to said switching means are linked with a cutout means to prevent the operation of the multiple throw-switching means while the roller member is being rotated.

PO-1050
(5/69)

UNITED STATES PATENT OFFICE
CERTIFICATE OF CORRECTION

Patent No. 3,594,587      Dated July 20, 1971

Inventor(s) Gerhard Martens and Herbert Turk

It is certified that error appears in the above-identified patent and that said Letters Patent are hereby corrected as shown below:

Column 2, line 18, "1,23,029" should read -- 1,223,029 --.

Column 4, line 23, "wheat stone" should read -- Wheatstone --; line 42, "will occur" should read -- occurs --; line 42, "flow" should read -- flows --.

Signed and sealed this 18th day of April 1972.

(SEAL)
Attest:

EDWARD M.FLETCHER,JR.      ROBERT GOTTSCHALK
Attesting Officer      Commissioner of Patents